United States Patent
Hethcock et al.

(10) Patent No.: US 7,731,817 B2
(45) Date of Patent: Jun. 8, 2010

(54) INTERLOCKING TOOTH BOND FOR ASSEMBLY OF FIBER COMPOSITE LAMINATES

(75) Inventors: James Donn Hethcock, Colleyville, TX (US); Rodney H. Jones, Colleyville, TX (US)

(73) Assignee: Bell Helicopter Textron Inc., Fort Worth, TX (US)

( * ) Notice: Subject to any disclaimer, the term of this patent is extended or adjusted under 35 U.S.C. 154(b) by 1005 days.

(21) Appl. No.: 10/546,493

(22) PCT Filed: Feb. 24, 2004

(86) PCT No.: PCT/US2004/005584

§ 371 (c)(1),
(2), (4) Date: Jul. 7, 2006

(87) PCT Pub. No.: WO2004/110738

PCT Pub. Date: Dec. 23, 2004

(65) Prior Publication Data

US 2006/0251847 A1    Nov. 9, 2006

(51) Int. Cl.
  *B32B 37/12* (2006.01)
  *B32B 37/18* (2006.01)
  *B32B 38/04* (2006.01)
  *B32B 3/06* (2006.01)
(52) U.S. Cl. .............. 156/258; 156/304.1; 156/304.3; 156/304.5; 156/305; 428/59; 428/62
(58) Field of Classification Search .......... 156/258, 156/304.1, 304.3, 304.5, 305; 428/57, 58, 428/60, 61, 62
See application file for complete search history.

(56) References Cited

U.S. PATENT DOCUMENTS

| 1,747,964 A | * | 2/1930 | Wirth ..................... 403/265 |
| 2,027,747 A | | 1/1936 | Morton |
| 2,792,318 A | | 5/1957 | Welch |
| 3,224,316 A | * | 12/1965 | Grikscheit et al. ............ 411/13 |
| 3,793,402 A | * | 2/1974 | Owens ....................... 525/81 |
| 4,301,684 A | * | 11/1981 | Thompson et al. ............ 73/602 |
| 5,474,635 A | * | 12/1995 | Jacob et al. .................. 156/257 |
| 5,506,018 A | | 4/1996 | Jacob |
| 5,601,676 A | * | 2/1997 | Zimmerman et al. .......... 156/98 |
| 5,618,602 A | * | 4/1997 | Nelson ........................ 428/60 |

FOREIGN PATENT DOCUMENTS

DE    2441470 A1    3/1976

(Continued)

OTHER PUBLICATIONS

European Patent Office, Supplementary European Search Report for corresponding European patent application No. EP04775802, Dec. 11, 2008.

(Continued)

*Primary Examiner*—Kat Wyrozebski
*Assistant Examiner*—Scott W Dodds
(74) *Attorney, Agent, or Firm*—James E. Walton

(57) ABSTRACT

An improved method of joining fiber composite laminates is disclosed. Two fiber composite laminates may be joined together end-to-end. The bonding is done through the thickness of the fiber composite laminates. There are two ways to form the bond: (1) non-interlocking; and (2) interlocking.

24 Claims, 8 Drawing Sheets

FOREIGN PATENT DOCUMENTS

| | | | |
|---|---|---|---|
| DE | 3524964 | A1 | 1/1987 |
| DE | 3809907 | A1 | 11/1988 |
| JP | 10175256 | A | 6/1998 |
| WO | 9013402 | A | 11/1990 |
| WO | 0020197 | A | 4/2000 |

OTHER PUBLICATIONS

Bahei-El-Din, Y. & Dvorak, G., New designs of adhesive joints for thick composite laminates, Composites Science and Technology 61/1 (Jan. 2001), pp. 19-40, Elsevier Science Ltd.

* cited by examiner

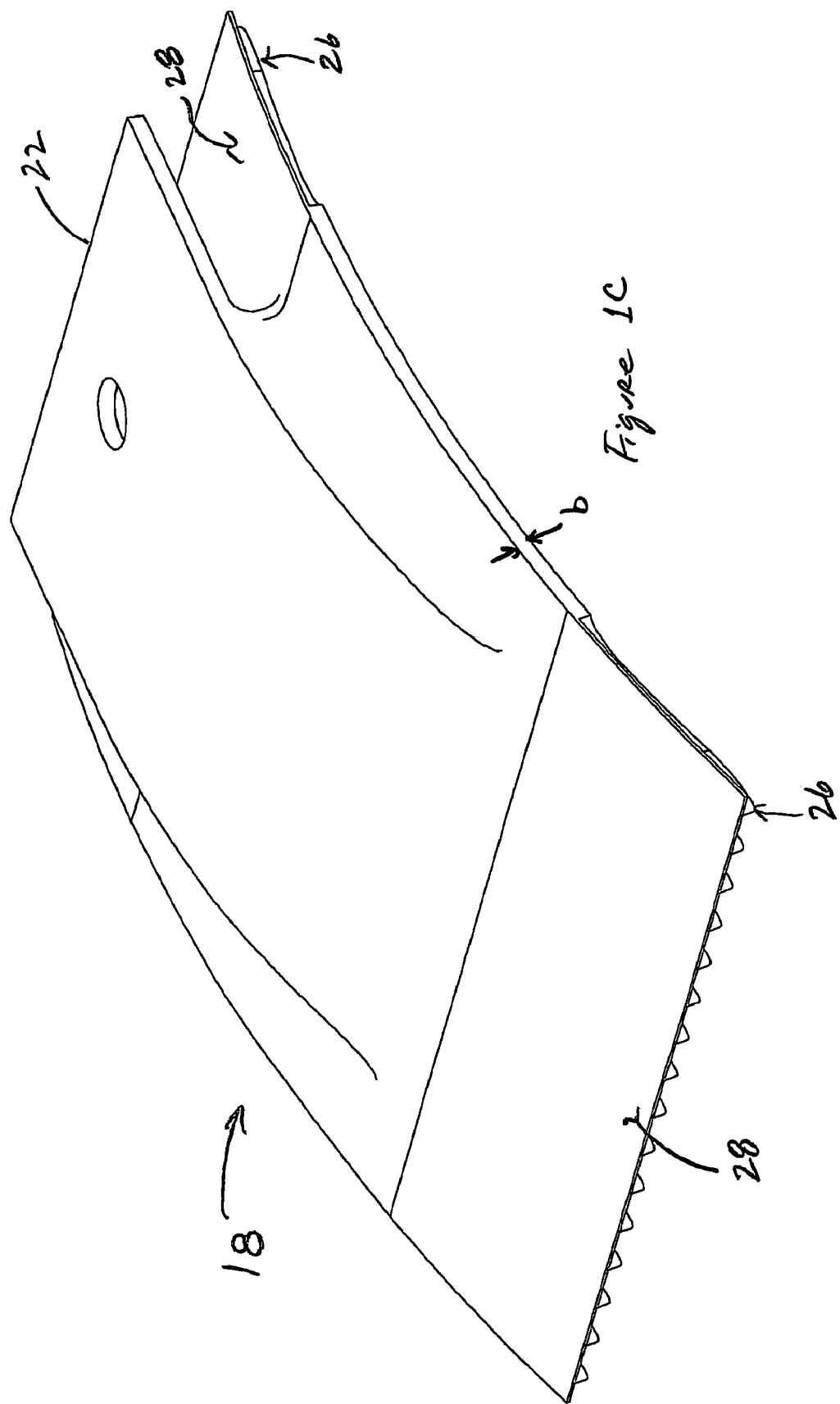

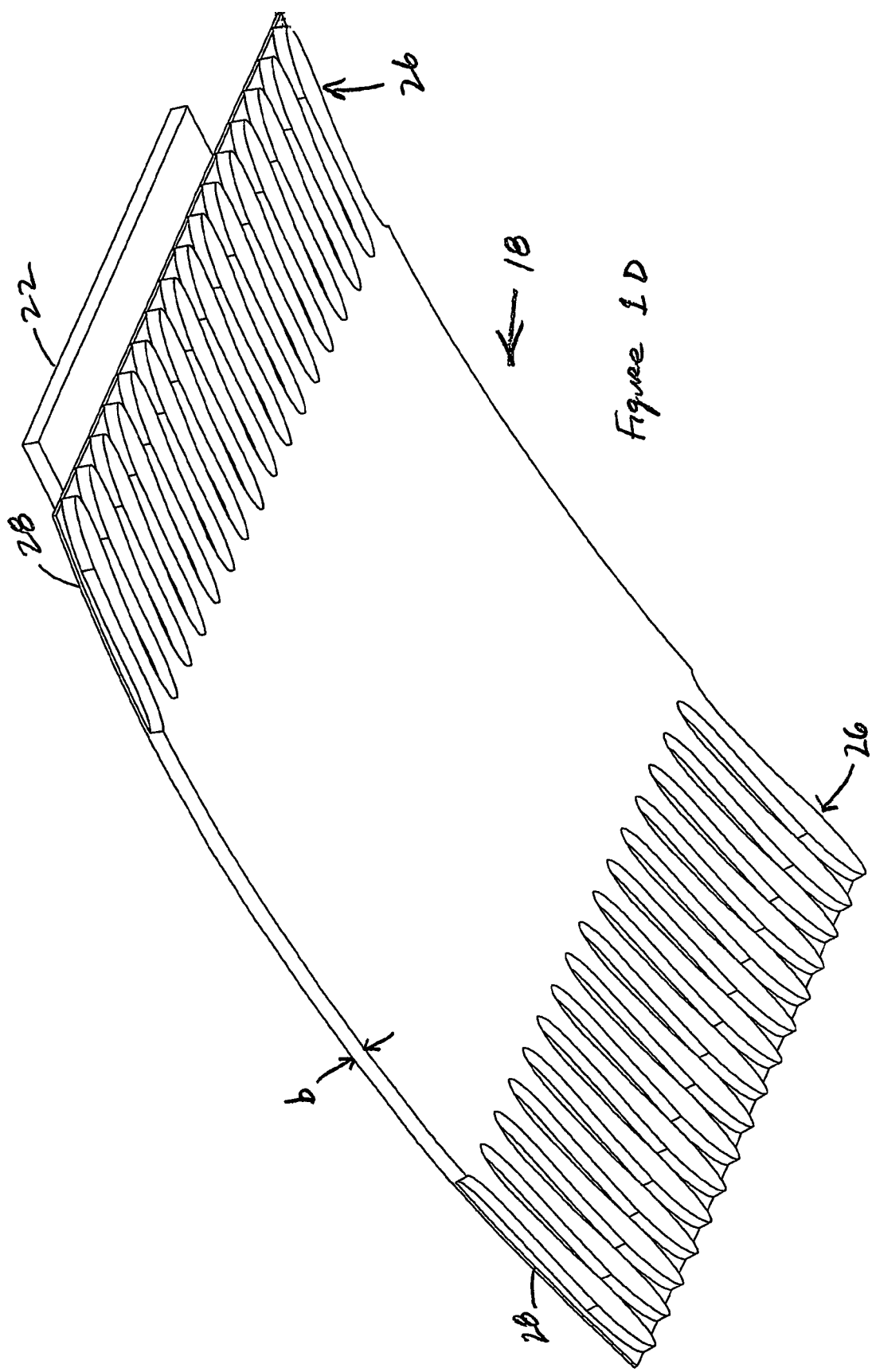

INTERLOCKING TOOTH BOND FOR ASSEMBLY OF FIBER COMPOSITE LAMINATES

TECHNICAL FIELD

The present invention relates to the joining of fiber composite laminates.

DESCRIPTION OF THE PRIOR ART

Fiber composite laminates have been in use for many years. They are a high-strength, low-weight alternative to metallic parts. Fiber composite laminates are particularly well suited for use in the aircraft industry where reducing weight and increasing strength are of utmost importance.

Fiber composite laminates are formed by building up multiple layers, lamina, or plies, of composite fibers one upon another. Each layer of fibers is oriented in a specific direction to provide particular properties to the laminate. In a typical laminate, some fibers extend parallel to the longitudinal axis, others extend transverse to the longitudinal axis, and others extend "off-axis" at various angles to the longitudinal axis. By laying up and orienting the fiber layers in certain configurations, the stiffness and other properties of the laminate can be predetermined.

A significant problem with fiber composite laminates is their relatively low damage tolerance. The composite fibers provide strength to the laminate in the plane of the material, but the only material perpendicular to that plane is the resin. However, the resin itself is not capable of arresting the growth of cracks and interlaminar failures known as delamination. Delamination, the most common type of failure in fiber composite laminates, most often begins at the edges of the plies at the ends of the fiber composite laminate and at joints.

Over the years, one of the greatest challenges faced by designers who work with fiber composite laminates is how to join two fiber composite laminates together. These joints are necessary to form large complicated structures, such as aircraft fuselages. However, because fiber composite laminates are so difficult to join together there is always additional bulk, weight, and cost associated with making joints that are sufficiently strong and safe.

Bonded joints typically load the laminates across their weak interlaminar interfaces, so that even when the bond quality and strength exceed that of the base laminates, the failure site simply shifts to the next ply boundary. Many different joint configurations currently exist, including: (1) single lap joints; (2) double lap joints; (3) scarf joints; and (4) bolted joints, each with relative advantages and problems. Most of these methods involve building up the thickness of the fiber composite laminate at the end being joined, and overlapping the two fiber composite laminates that are being joined. This adds bulk and weight to the structure.

Single lap joints are the least efficient and have the lowest damage tolerance. In single lap joints, there is only a single load path. Because the two fiber composite laminates are overlapped, tension loads cause the two laminates to peel away from each other, resulting in interlaminate delamination at the ends of the laminates. Although the ends of the fiber composite laminates can be chamfered or tapered, the joint is still susceptible to peel and delamination.

In double lap joints, the two fiber composite laminates to be joined are placed end-to-end and cover plies are adhered over the joint on the top and bottom of both fiber composite laminates. Thus, tension loads in the fiber composite laminates must be passed up through the cover plies. Because only the outermost layers of the fiber composite laminates are in contact with the cover plies, the outermost layers bear most of the load. This typically results in a tension failure of the adhesive in the butt joint or an interlaminar shear failure initiating at one of the ends of the cover plies where the cover plies are adhered to the outermost layers of the fiber composite laminate.

In scarfed joints, although it is possible to eliminate the cover plies, there are other problems. The scarf angle has to be very low to produce sufficient surface area for the bond interface. As such, scarf joints are very difficult and expensive to fabricate. Often, scarf joints require cover plies.

In bolted joints, a bolt is passed through the overlapping ends of two fiber composite laminates. Although adhesives are typically not used, a sealant is required. Bolted joints offer improved damage tolerance relative to the bonded joint options discussed above, but there are many other problems with bolted joints. The bolt holes have to be closely aligned, and the holes must be drilled very precisely in diameter to match the bolt. It is very difficult and expensive to drill precise holes with low tolerances in fiber composite laminates because the laminates are easily damaged during the drilling process. Repeated loads on bolts cause bearing wear and brooming of the bolt hole. Because the two laminates are overlapped, eccentricity is introduced into the load path, which causes bending and tension on the bolts and results in premature bolt failure.

All of these methods require substantially building up the thickness of the fiber composite laminates at the joint to provide sufficient strength. Additional layers of composite may be required to allow for flush installation of bolt heads at the outer surface of the joint. Curvature further complicates all of these joints. Thus, although these methods represent significant developments in the joining fiber composite laminates, considerable shortcomings remain.

SUMMARY OF THE INVENTION

There is a need for an improved method of joining fiber composite laminates.

Therefore, it is an object of the present invention to provide an improved method of joining fiber composite laminates that is weight and cost efficient while offering improved damage tolerance relative to existing bonded joint configurations.

This object is achieved by providing a method of joining fiber composite laminates in which the bonding is done through the thickness of the fiber composite laminates to reduce the interlaminar stresses typical of other configurations. There are two ways to form the bond: (1) non-interlocking; and (2) interlocking.

The present invention provides significant advantages, including: (1) fiber composite laminates can be joined end-to-end without additional build-up of the laminates; (2) structural cover plies are not required, but may be used; (3) the probability of interlaminar failures is greatly reduced; (4) visual inspection of the joint is possible; (5) cover plies can be used for additional strength or damage indication; (6) extra location tolerance is provided in large structural assemblies; (7) joint geometry overcomes interlaminar weakness; (8) joints exhibit failsafe capability, in that a limit load or portion of the ultimate load can be carried after adhesive failure; (9) joints are energy absorbing, in that there is stroking or movement of the joint under load prior to failure; (10) joints have higher specific strengths than bonded or bolted joints; (11) joint is low profile, which reduces weight, eliminates eccentricity, and increases aerodynamic smoothness; (12) performance of joints after being damaged is more predictable; (13)

tooth profiles can be selectively modified to achieve different performance characteristics; (14) energy absorption can be increased; and (15) inherently brittle material can be made to produce a ductile response.

Additional objectives, features, and advantages will be apparent in the written description that follows.

BRIEF DESCRIPTION OF THE DRAWINGS

The novel features believed characteristic of the invention are set forth in the appended claims. However, the invention itself, as well as, a preferred mode of use, and further objectives and advantages thereof, will best be understood by reference to the following detailed description when read in conjunction with the accompanying drawings, wherein:

DESCRIPTION OF THE PREFERRED EMBODIMENT

The present invention is an improved method of joining two fiber composite laminates together in an end-to-end fashion. The method produces a low profile adhesive bond for structurally splicing two fiber composite panels together. There are two main embodiments of the invention: (1) mechanically interlocking teeth; and (2) non-interlocking teeth. It will be appreciated that many combinations of interlocking teeth, non-interlocking teeth, and offset interlocking and a non-interlocking teeth may also be employed, depending upon the application in which the laminates are used. The tooth-type bond of the present invention virtually eliminates peel in the adhesive joint, thereby reducing the likelihood of an interlaminar failure. Laminates joined by the method of the present invention have substantially improved damage tolerance relative to conventional lap splice bonds. The bond geometry inhibits disbond cracks from propagating down the length of the joint and causing a catastrophic failure.

Figure 1A:
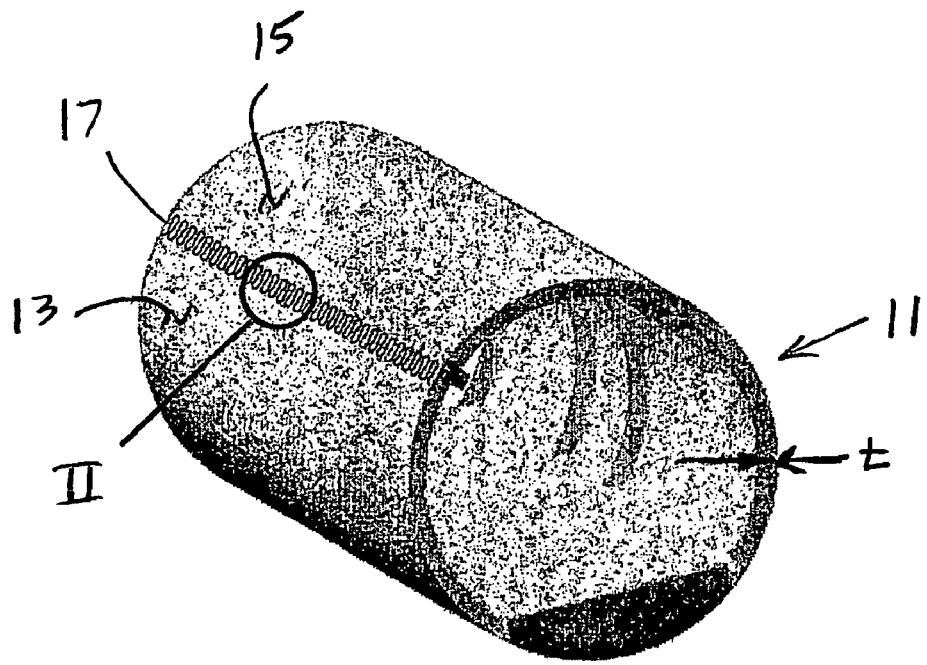
FIG. 1A is a perspective view of an aircraft fuselage having a fiber composite laminate joint according to the present invention.

Referring now to FIGS. 1A-1E and 2 in the drawings, the interlocking embodiment of the present invention is illustrated. In FIG. 1A, a long, continuous joint is illustrated. In FIGS. 1B-1E, several discreet joints are illustrated. In the interlocking teeth embodiment, the teeth are dovetailed to provide a positive mechanical lock under both shear and tensile loading. A portion of an aircraft fuselage 11 is shown. Fuselage 11 has thin walls formed by fiber composite laminates. As is shown in FIG. 1A, at least two fiber composite laminate walls 13 and 15 are joined by at least one elongated continuous joint 17. In this example, joint 17 extends along the entire longitudinal length of fuselage 11 and passes through the entire thickness t of walls 13 and 15, such that the bonding is done through the thickness t of fiber composite laminates 13 and 15. Although joint 17 has been shown as a straight joint, it will be appreciated that in some applications, it may be desirable to have joint 17 form a curved or helical path. Furthermore, although the present invention will be explained with reference to an aircraft fuselage, it should be understood that the present invention may used in any application or industry in which it is desirable to join two fiber composites laminates together end-to-end.

Figure 1B:
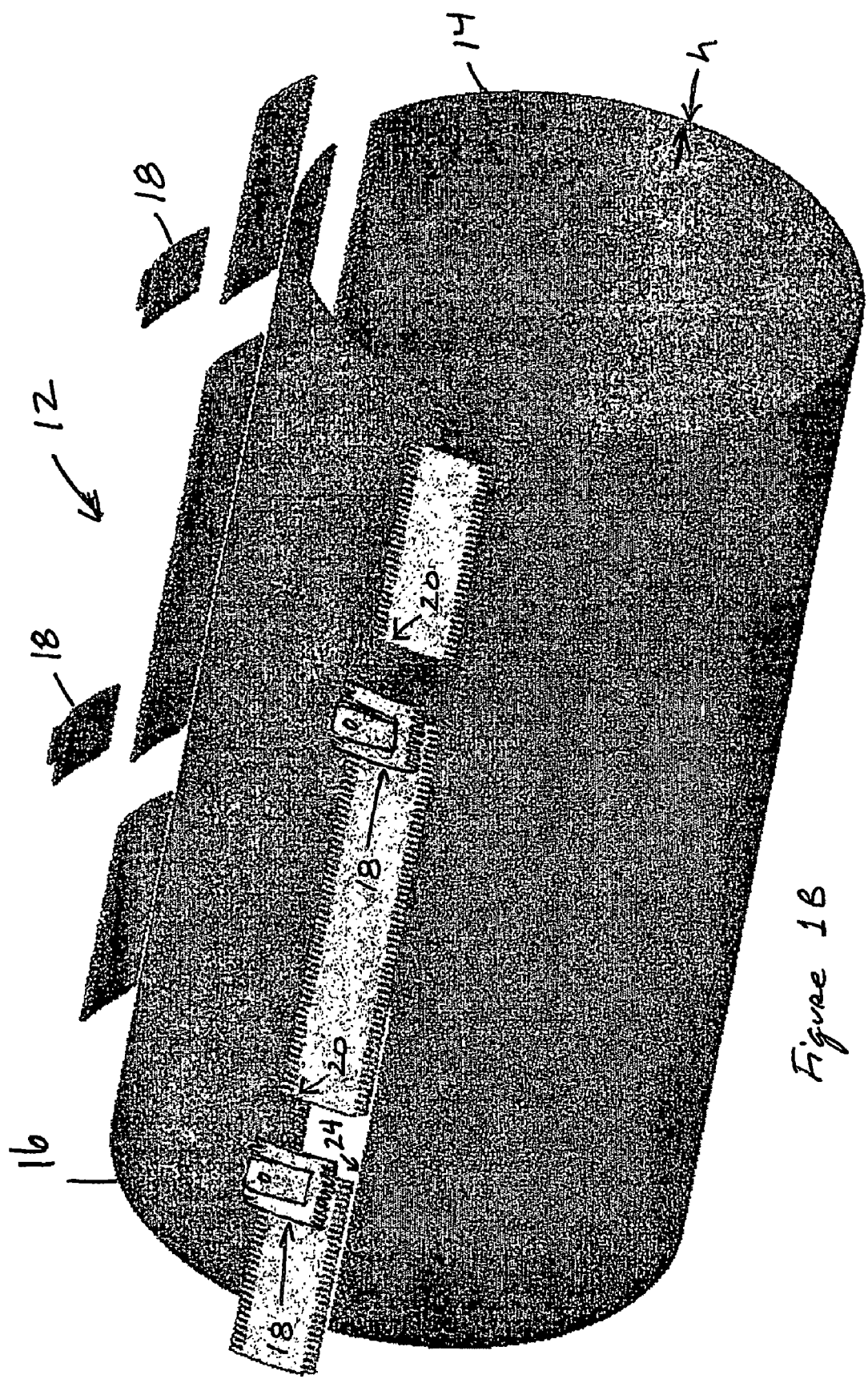
FIG. 1B is an exploded perspective view of a composite laminate structure having discrete joints according to the present invention.
Figure 1E:
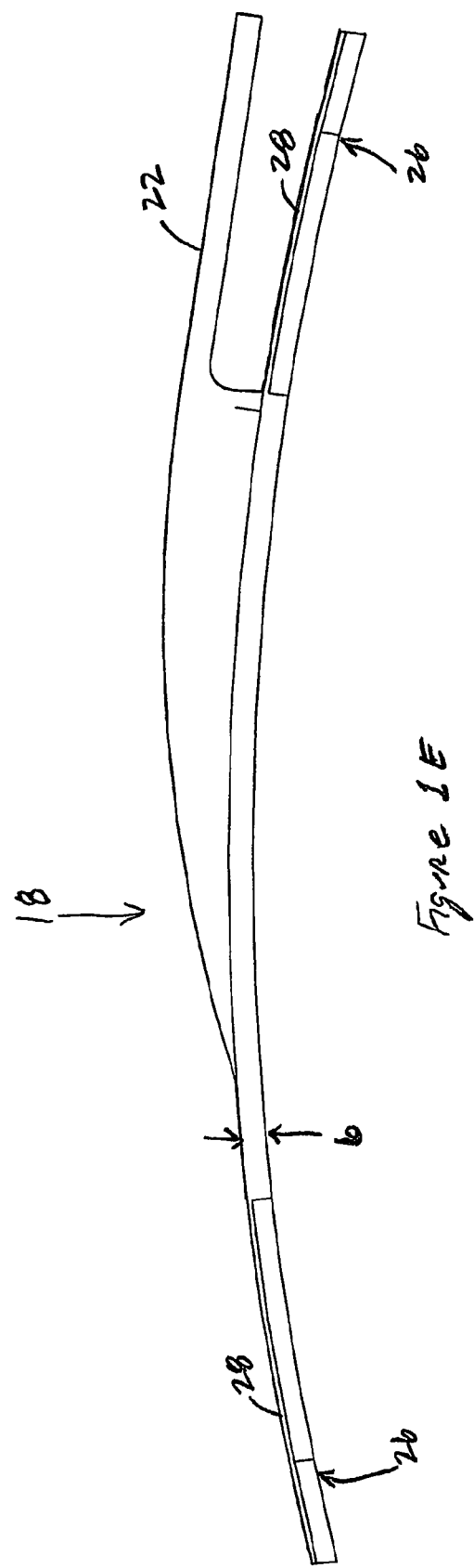
FIGS. 1C-1E are enlarged views of a fitting component of FIG. 1B.
Figure 1A:
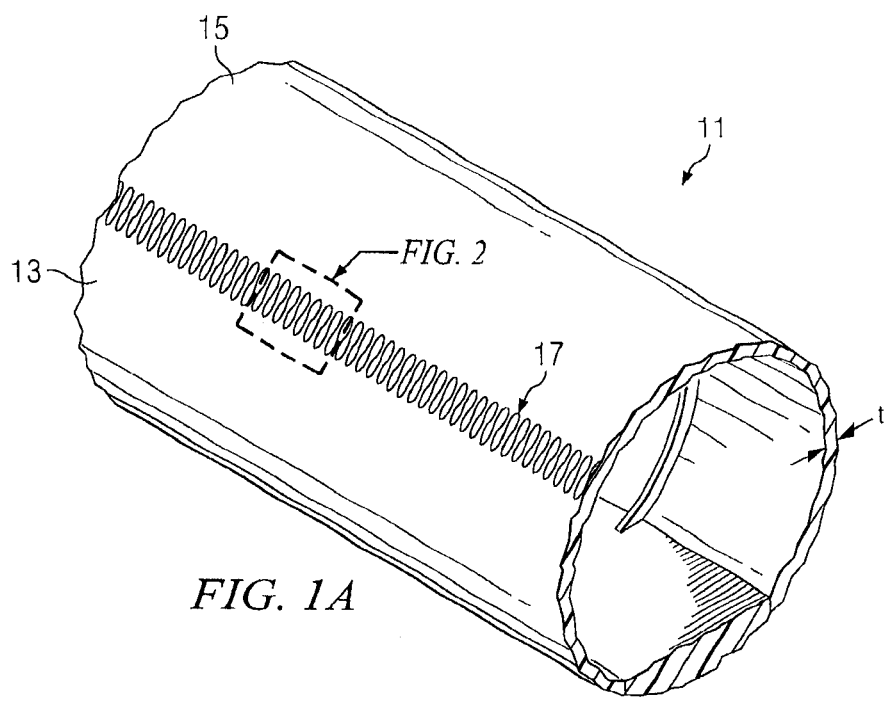
Figure 1E:
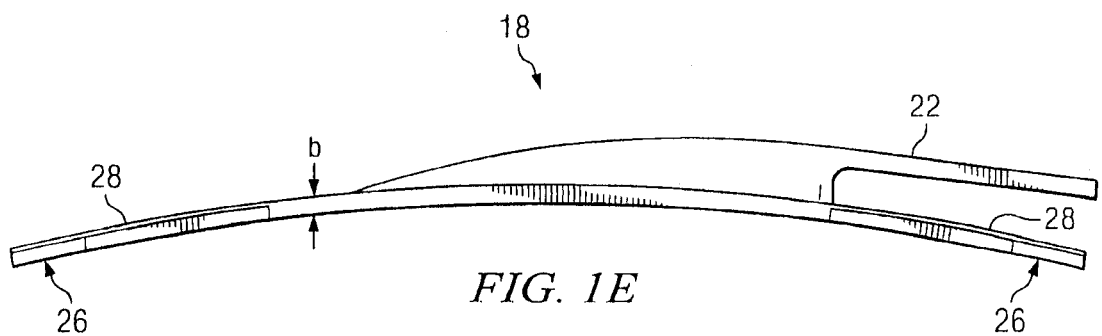
Figure 1B:
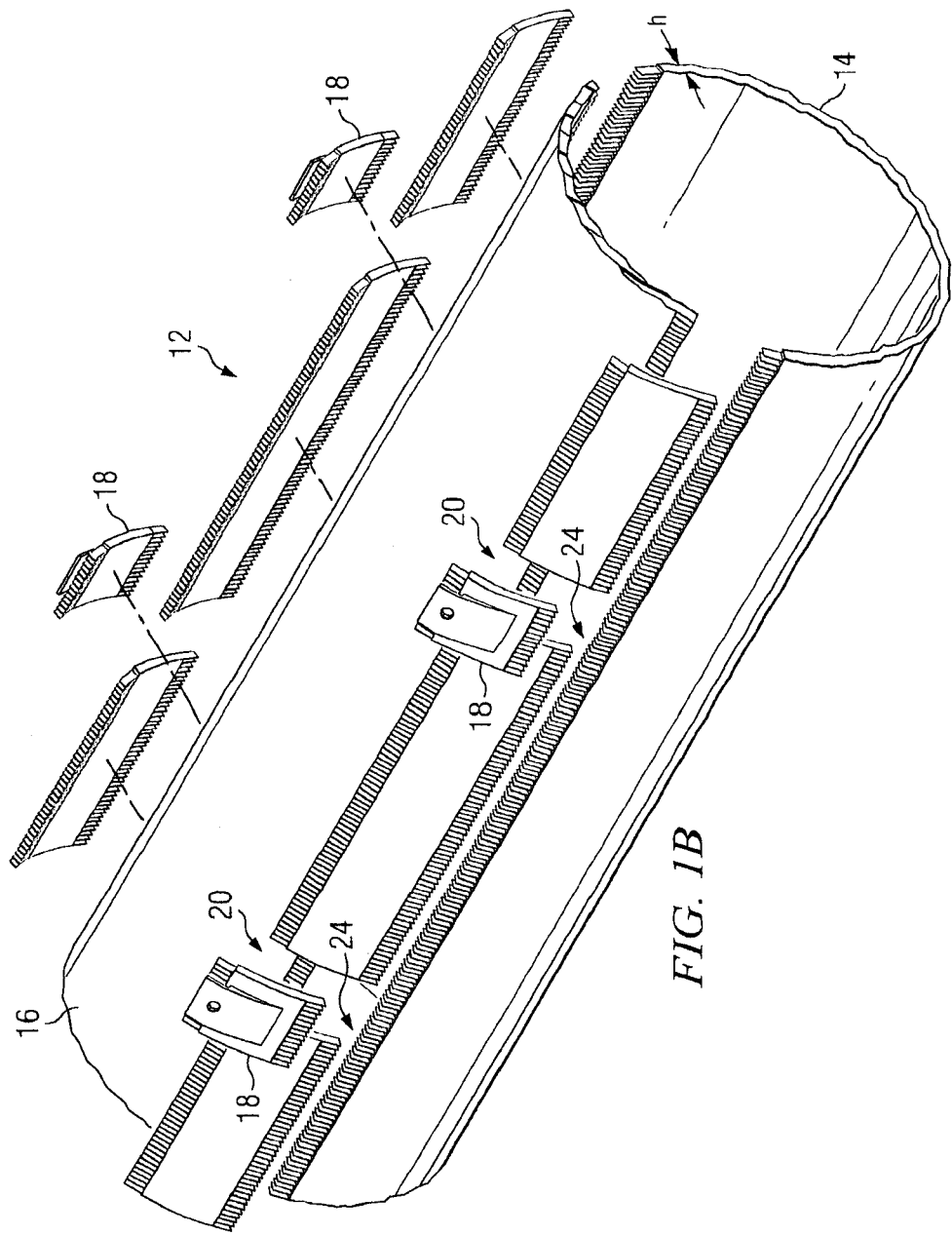
Figure 1C:
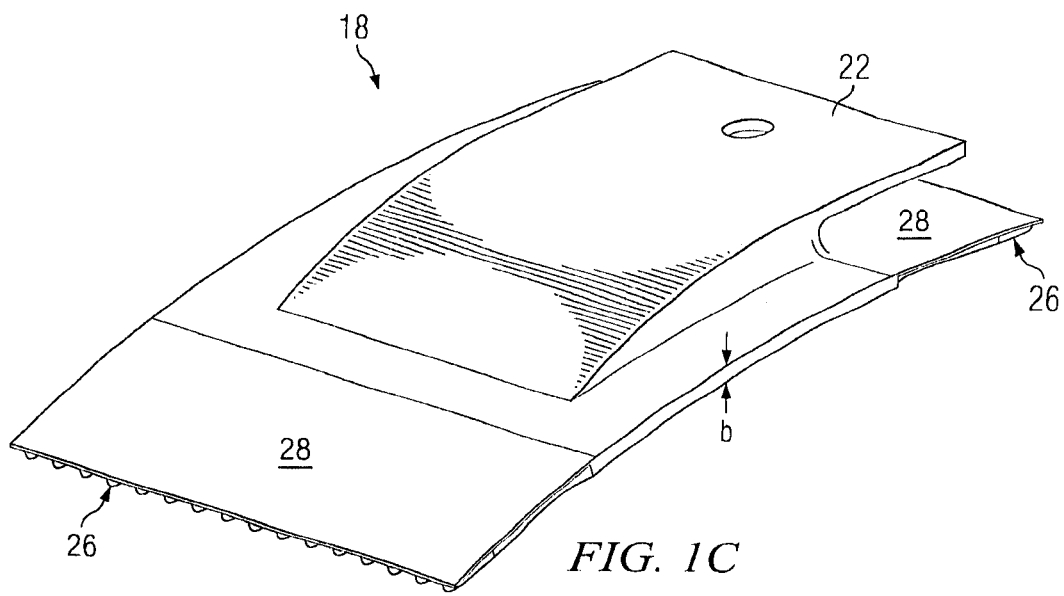
Figure 1D:
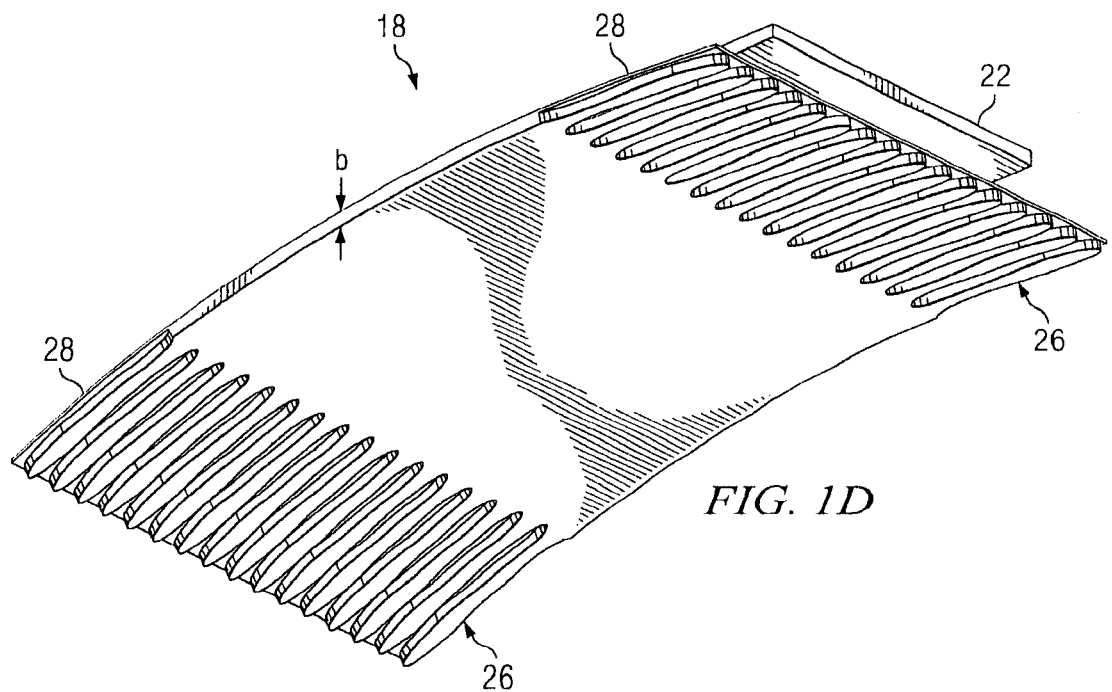
Figure 2:
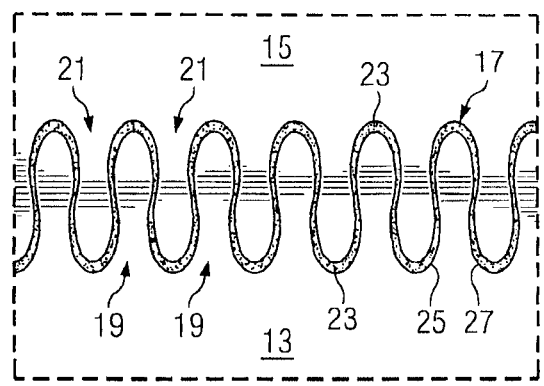
Figure 3D:
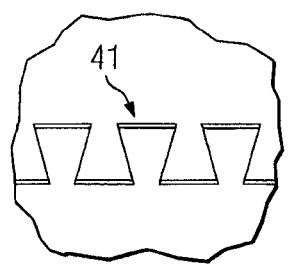
Figure 3D:
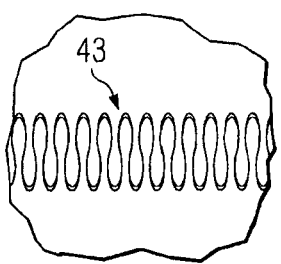
Figure 3D:
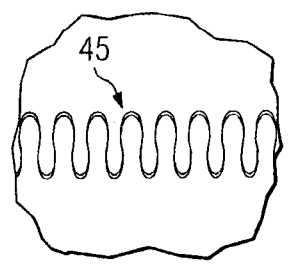
Figure 3D:
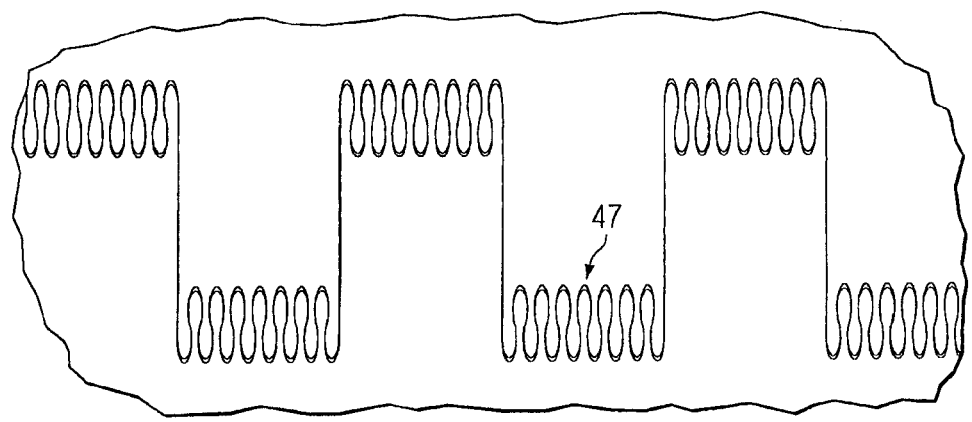
Figure 4:
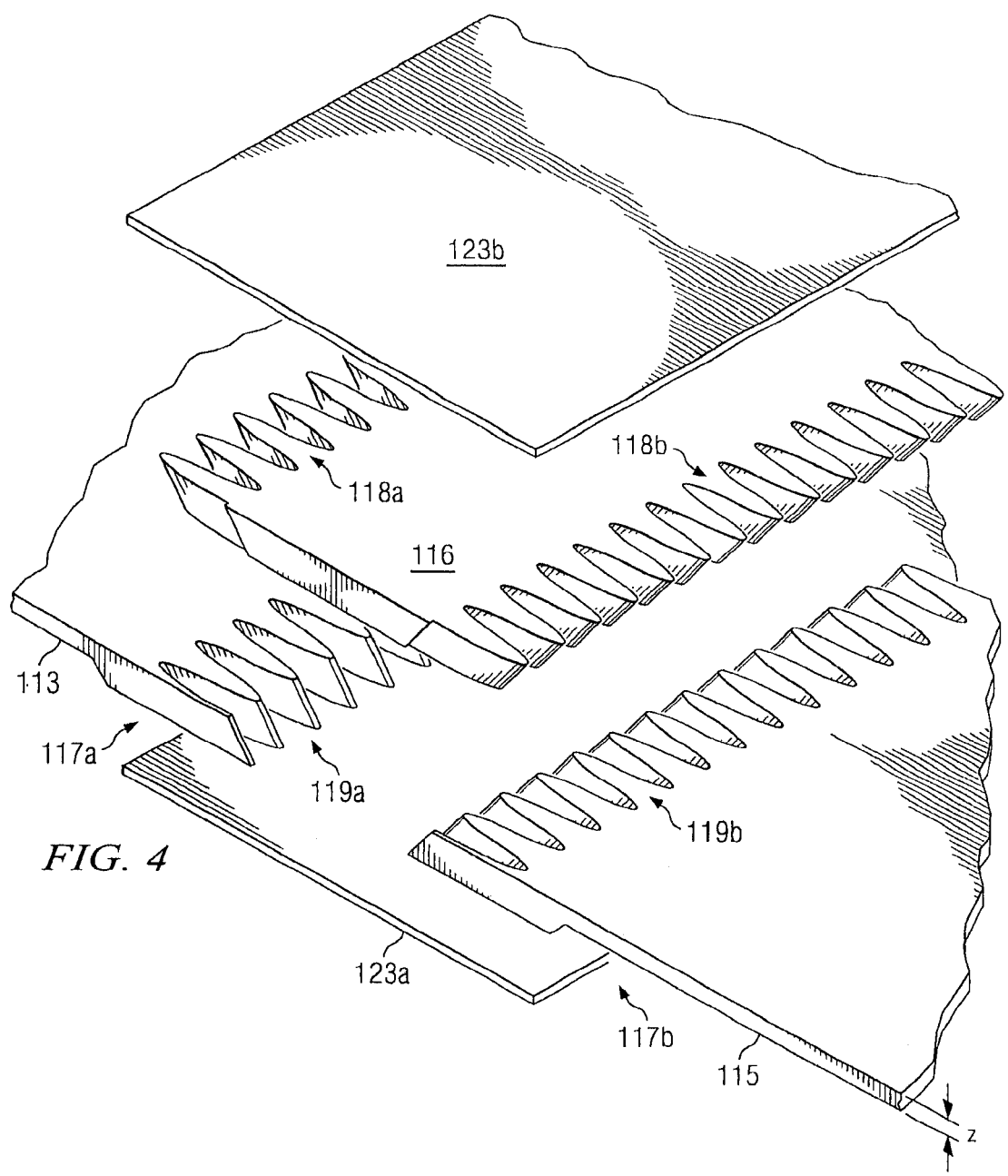
Figure 5:
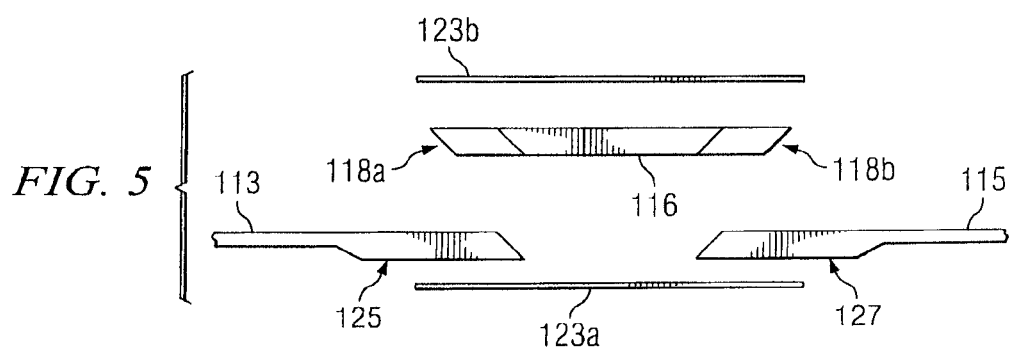
Figure 6:
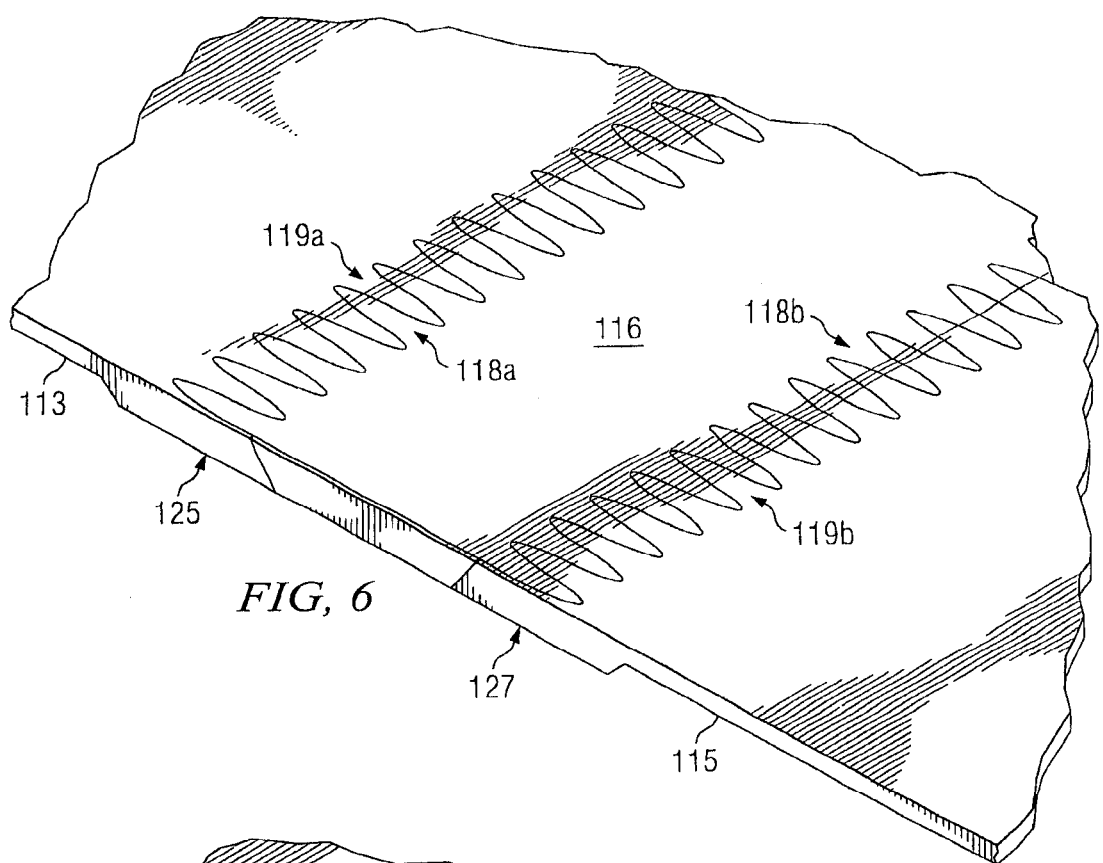
Figure 7:
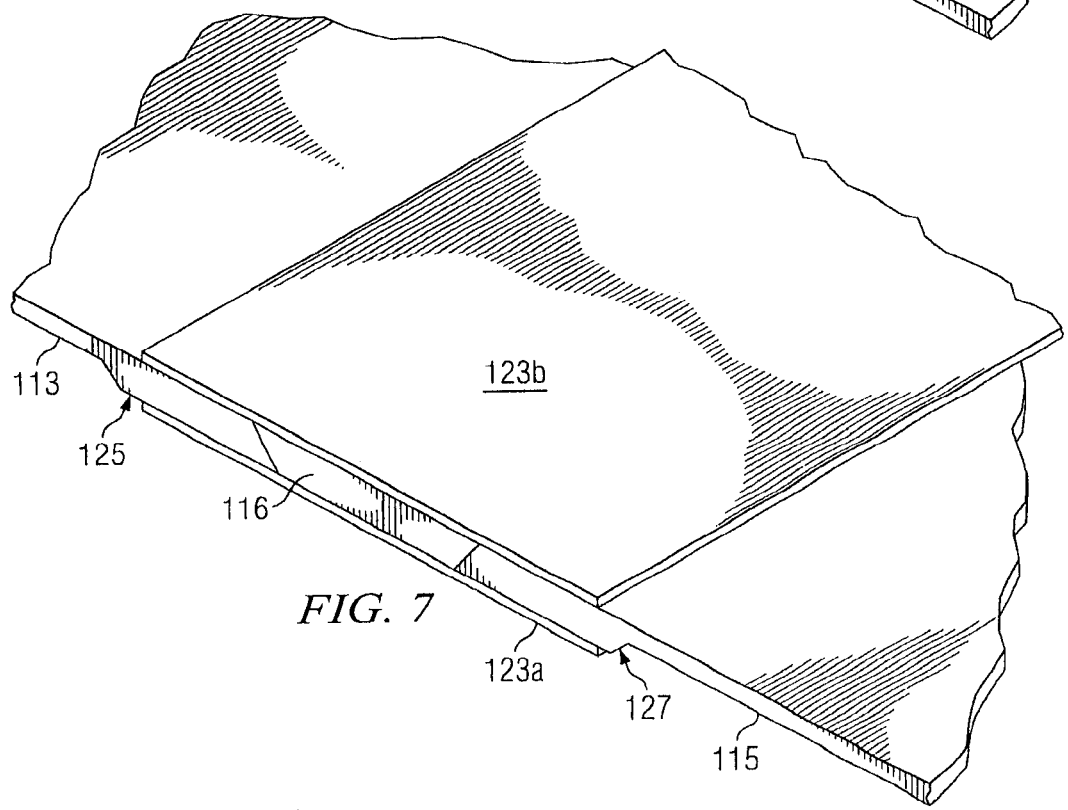

In the example of FIGS. 1B-1E, a component part, such as an attachment fitting 18, is joined to a composite laminate structure 12. In this embodiment, each fitting 18 is joined to fiber composite laminate walls 14 and 16 at discreet joints 20. Bracket 18 includes a lug member 22 for mechanical coupling to other component parts. In this example, joint 20 between each fitting 18 and walls 14 and 16 is. discreet and does not extend along the entire longitudinal length of structure 12. In addition, as is best seen in FIGS. 1C-1E, joint 20 is formed by teeth 24 that pass through the entire thickness h of walls 14 and 16, and teeth 26 that do not pass through the entire thickness b of fitting 18. Teeth 26 may be machined into or formed in fitting 18 by any number of conventional means. This configuration leaves a cover portion 28 on the exterior surface of fitting 18 over teeth 26. It will be appreciated that teeth 24 may be configured to only pass partially through walls 14 and 16, that teeth 26 may pass through the entire thickness b of fitting 18, and that cover 28 is optional.

Figure 2:
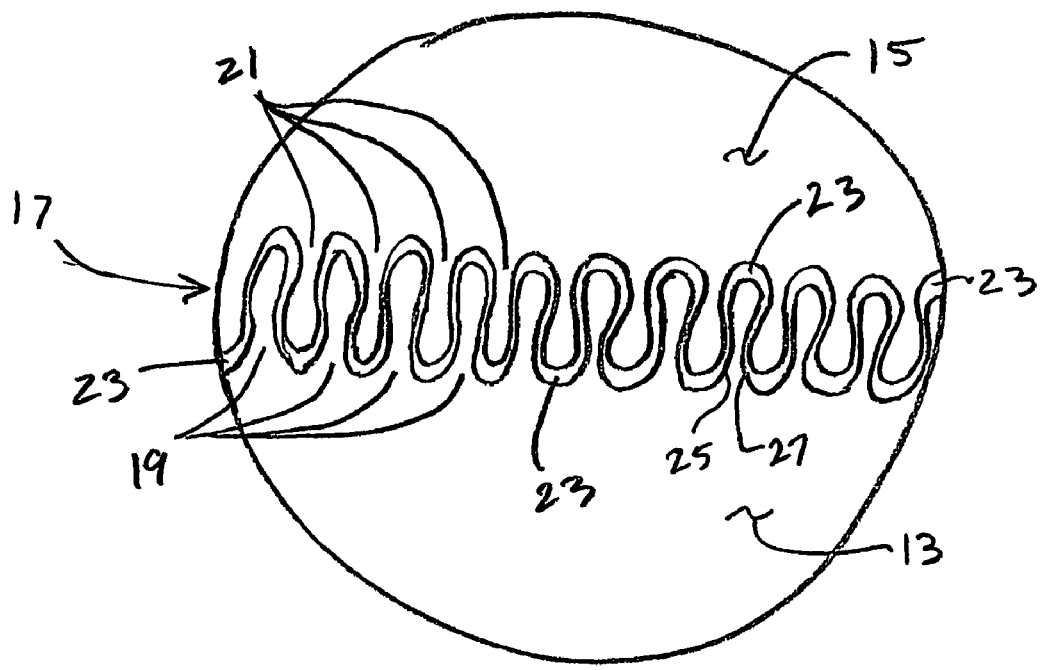
FIG. 2 is an enlarged view of portion 11 of the joint of FIG. 1A.

As best seen in FIG. 2, joint 17 is formed by a series of mechanically interlocking teeth 19 and 21, in which teeth 19 are formed in the end of laminate 13, and teeth 21 are formed in the end of laminate 15. In the preferred embodiment, teeth 19 and 21 do not contact each other; rather, a selected spacing, or bond line, is formed between teeth 19 and 21. In the preferred embodiment, the bond line does not have a continuous thickness along its entire length. Instead, the spacing of the bond line is selected to generate specific performance and response characteristics. For example, the bond line is thick at the tips of teeth 19 and 21, and tapers down as it progressed along the length of the sides of teeth 19 and 21. The bonds line is thinnest near the midpoint of teeth 19 and 21. The bond is compliant relative to the in-plane fibrous composite. The additional bond line thickness at the tip of each tooth 19 and 21 provides softness under tension load because the shear path becomes relatively stiffer.

It is desirable that adhesive 23 be chosen such that as the compression of adhesive 23 is increased, the shear strength of adhesive 23 is increased. Adhesive 23 is injected between teeth 19 and 21, or may be applied by other suitable methods, such as brushing, spraying, wiping, coating, or dipping. After injection, adhesive 23 is smoothed out so as to remain flush with the surfaces of laminates 13 and 15. Once assembled, the joint is cured by a conventional curing process that may be accelerated by raised temperatures and/or pressures.

When joint 17 is subjected to excessive stress and strain, the adhesive begins to strain excessively at the thicker area adjacent to the tips of the teeth. This marks an initial failure mode. The adhesive will then continue to break apart and grind down as higher or repeated loads are applied. The initial failure mode continues until the sides of teeth 19 and 21 come into contact with each other. At that point, the teeth are capable of withstanding a relatively large amount of tensile force. Interlocked teeth 19 and 21 will hold joint 17 together until the ultimate strength of teeth 19 and 21 is reached, at which time teeth 19 or 21 will break. This results in laminates 13 and 15 separating from each other in a catastrophic failure. An important advantage of the mechanically interlocking teeth, is that a fail safe failure mode is created. The configuration of the joint provides the laminates with residual strength. In other words, the fiber composite laminates are still capable of reacting preset limit loads after initial failure. No other bonded joint has this capability.

It is important to note that fiber composite laminates 13 and 15, and adhesive 23, are inherently brittle. However, by using the bonding method of the present invention, these brittle materials can be made to respond in a ductile manner. This ductile behavior is typically beneficial, in that it reduces the probability of unexpected catastrophic failures, and provide the joint with residual strength. The profile of teeth 19 and 21, and, consequently, the size and shape of the bond line of adhesive 23, may be selectively tailored to produce a joint that responds to stress and strain in a predetermined fashion. This is particularly useful in situations when fiber composite laminates 13 and 15 are exposed to dynamic events, such as ballistic impacts, hydrodynamic rams, and rapid decompressions. When these transient events occur, the energy absorbing failure modes of the present invention allow the laminates to withstand the dynamic event without catastrophic failure until the event is over.

The profile of teeth 19 and 21 is selectively chosen based upon load requirements. Some profiles perform better in tension, and some perform better in shear. Thin fingers tend to perform better in tension, due to the increased length of bond line reacting tension load. The tooth geometry is optimized in tension by minimizing the variation in strain at the critical section or narrowest portion of tooth at the root. It has been found that stress concentrations exist at both sides 25 and 27 of the root of each tooth 19. By selectively shaping and sizing the profile of tooth 19, these zones of stress concentration can be merged. Thicker fingers or fingers with a low aspect ratio of length divided by width tend to perform better in shear by reducing bending effects in teeth after failure of adhesive and increasing the shear effects. The bond stress tends to peak at the sides of the tooth near the tip. By using an elliptical tooth profile, the bond stress variation along the sides of the tooth can be minimized. Thus, the preferred profile of teeth 19 and 21 is elliptical. This elliptical shape optimizes the bond line and helps postpone the onset of failure. This maximizes the volume of the tooth that is being worked, thereby maximizing the strength of the tooth. It is preferred that teeth 19 and 21 ultimately fail by breaking at the roots. Teeth 19 and 21 are preferably formed by cutting with a precision water jet cutting device, but may be formed by other means, such as conventional tools for precisely cutting complex shapes, including lasers and numerically controlled cutting devices. Insignificant cost is added to the joint by tailoring or optimizing the tooth profile.

Although it is not necessary, it may be desirable in some situations to add additional plies at the edge of fiber composite laminates 13 and 15 adjacent joint 17. This provides additional joint strength through increased bond area. These additional plies may be either symmetrical, i.e., plies added to the surfaces of both laminates 13 and 15; or nonsymmetrical, i.e., plies added only to the surface of one laminate 13 or 15.

In addition, optional cover pieces (see FIGS. 4-7) may be installed on the top and bottom surfaces of laminates 13 and 15 over joint 17. These cover pieces do not necessarily carry significant loads, but encapsulate the joint and eliminate peel at the edges of the bonded teeth. Fiberglass fabrics work well as cover pieces, because some fiberglass fabrics react to over-straining by discoloring. For example, such fiberglass fabrics produce a yellow spot in an otherwise clear fabric when over-strained. The use of cover plies also aids in the attenuation of ultrasonic waves used to inspect the bond line.

Figure 3A:
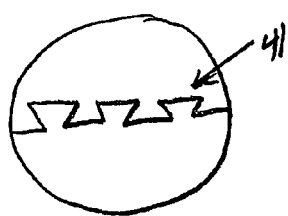
FIGS. 3A-3D are schematics showing various mechanically interlocking tooth profiles according to the present invention.
Figure 3B:
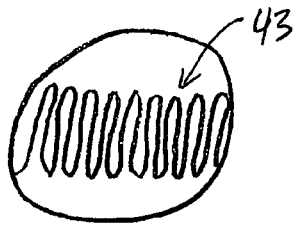
Figure 3C:
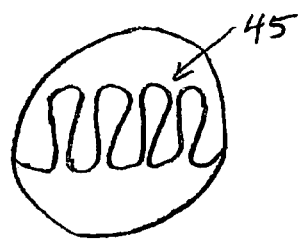
Figure 3D:
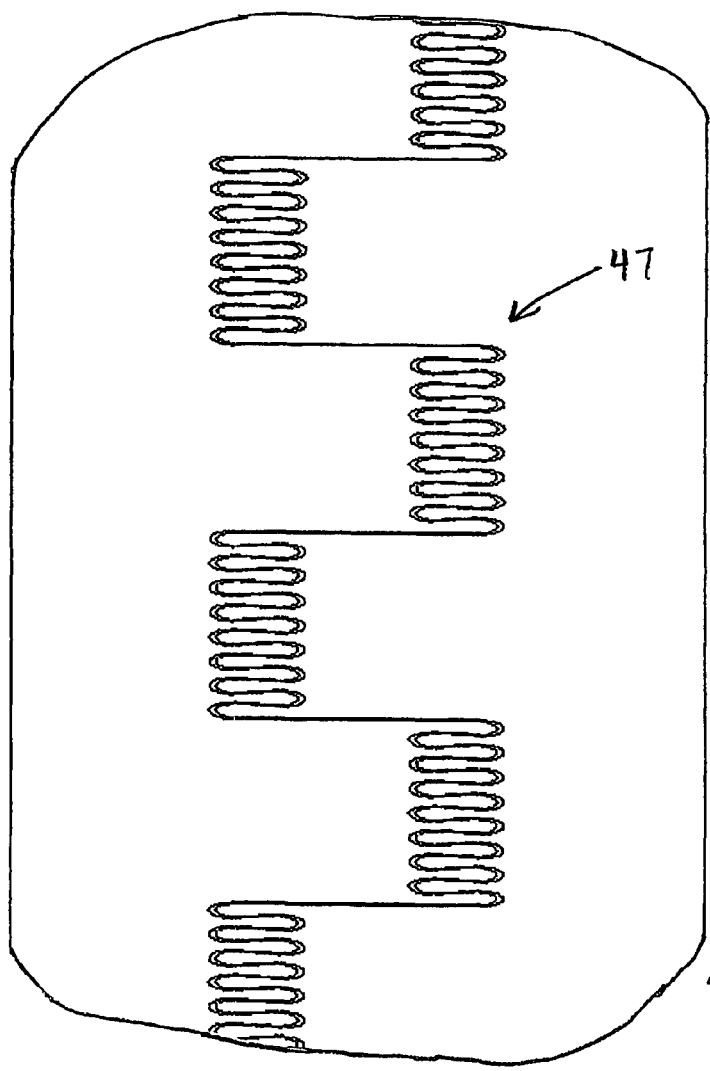
Figure 4:
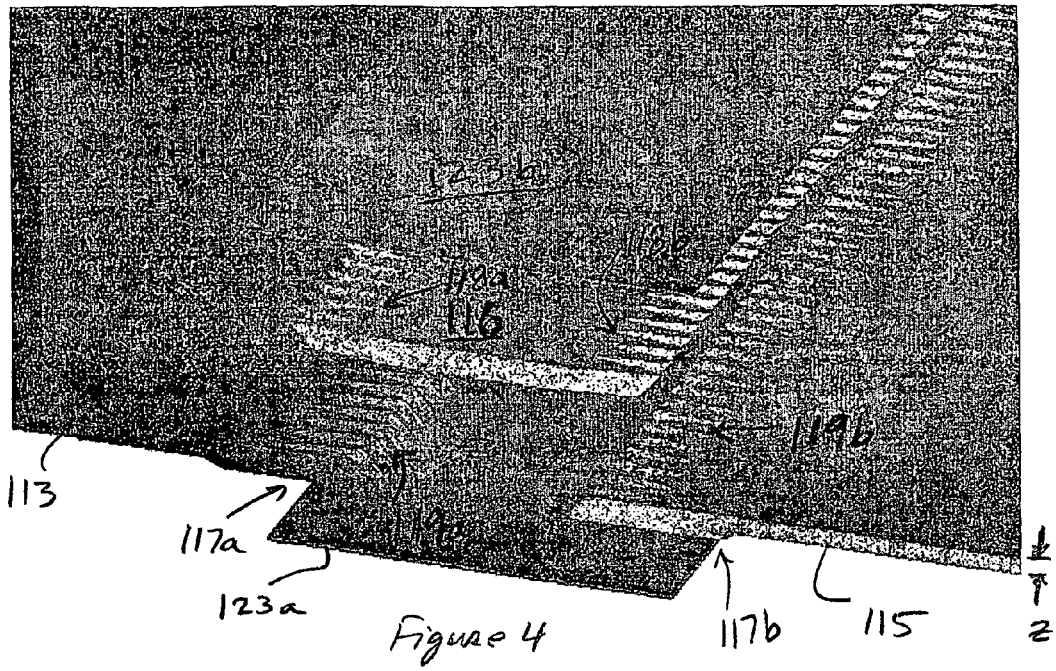
FIG. 4 is an exploded perspective view of a second embodiment of the joint according to the present invention.
Figure 5:
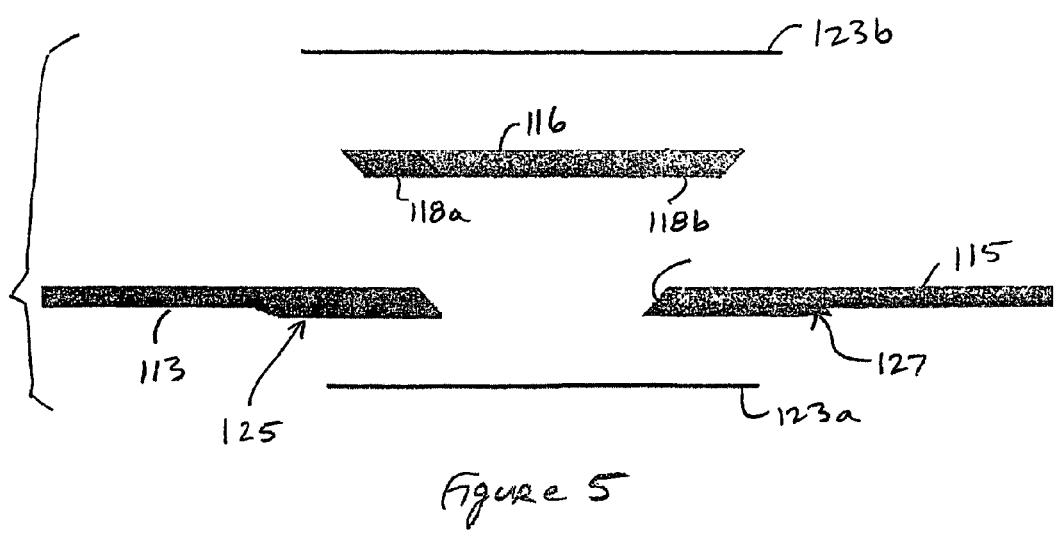
FIG. 5 is an exploded end view of the joint of FIG. 4.
Figure 6:
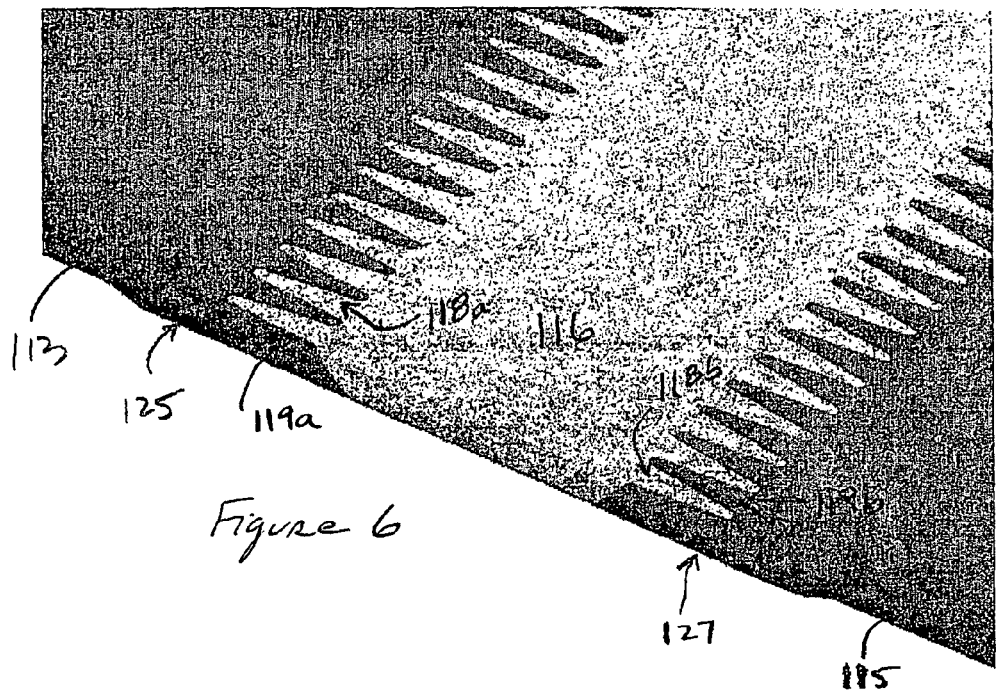
FIG. 6 is an assembled perspective view of the joint of FIG. 4 with the cover plies not shown.
Figure 7:
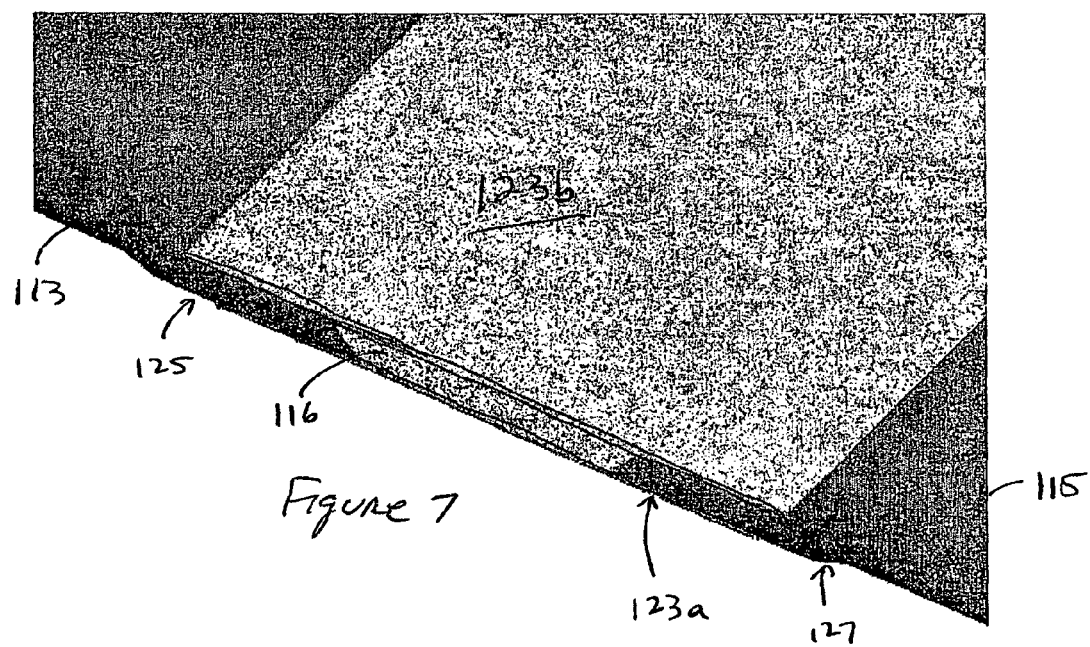
FIG. 7 is a fully assembled view of the joint of FIG. 4.

Referring now to FIGS. 3A-3D in the drawings, other possible mechanically interlocking tooth profiles are illustrated. FIG. 3A shows a joint 41 having a short, wide, stepped rhombus-shaped fingers; FIG. 3B shows a joint 43 having long, thin, elliptical fingers; and FIG. 3C shows a joint 45 having long, wide elliptical fingers. FIG. 3D shows a joint 47 having elliptical fingers that are offset. This type of staggered offset joint is particularly well suited for shear load applications or combined tension shear applications. The specific strength of both shear, out of plane bending, and tension is maximized with the joint pattern shown in FIG. 3D. All of these mechanically interlocking tooth profiles provide additional energy absorption.

Referring now to FIGS. 4-7 in the drawings, the non-interlocking embodiment of the present invention is illustrated. In this embodiment, two fiber composite laminates 113 and 115 are joined together via a bridge piece 116 by two parallel elongated continuous joints 117a and 117b. In this example, joints 117a and 117b extend along the entire longitudinal length of laminates 113 and 115, and pass through the entire thickness z of laminates 113 and 115, such that the bonding is done through the thickness z of laminates 113 and 115. Although joints 117a and 117b have been shown as a straight joints, in some applications, it may be desirable to have joints 117a and/or 117b form a curved or helical path.

Joint 117a is formed by a series of closely spaced triangular shaped teeth 119a and 118a, in which teeth 119a are formed in the end of laminate 113, and teeth 118a are formed in one end of bridge piece 116. Likewise, joint 117b is formed by a series of closely spaced triangular shaped teeth 119b and 118b, in which teeth 119b are formed in the end of laminate 115, and teeth 118a are formed in the other end of bridge piece 116. In the preferred embodiment, teeth 119a and 118a, and teeth 119b and 118b, do not contact each other; rather, a selected spacing, or bond line, is formed between the teeth of each joint 117a and 117b. The bond lines are filled with a strong adhesive 123 that is preferably soft in tension. As is shown, the teeth 119a, 118a, 119b, and 118b, are not cut perpendicular to the surfaces of laminates 113 and 115, and bridge piece 116, but are instead angled. This provides additional bond surface area for greater strength. A straight cut normal to the surface is also acceptable.

It will be appreciated that bridge piece 116 is optional, and that laminates 113 and 115 may be joined together directly. However, there are advantages to using bridge piece 116. For example, bridge piece 116 allows laminates 113 and 115 to be held in a fixed position and teeth 119a, 118a, 119b, and 118b to be cut into laminates 113 and 115 while in place. This eliminates the positional tolerance allowances for assembly. If laminates 113 and 115 can be moved for assembly and if the tooth geometry tolerances are sufficiently small, bridge piece 116 is not required. Teeth 119a, 118a, 119b, and 118b can serve as an aligning feature to aid assembly.

As with the interlocking embodiment described above, although it is not necessary, it may be desirable in some situations to add additional plies 125 and 127 at the edge of fiber composite laminates 113 and 115 adjacent joints 117a and 117b. This provides additional joint strength through increased bond area. These additional plies 125 and 127 may be either symmetrical, i.e., plies added to the surfaces of both laminates 113 and 115; or nonsymmetrical, i.e., plies added only to the surface of one laminate 113 or 115.

As with the interlocking teeth embodiment, optional cover pieces 123a and 123b may be installed on the top and bottom surfaces of laminates 113 and 115 over joints 117a and 117b. Cover pieces 123a and 123b do not carry significant loads, but encapsulate joints 117a and 117b and eliminate peel at the edges of the bonded teeth. As set forth above, fiberglass fabrics that discolor when over-strained are the preferred material for cover pieces 123a and 123b. Optional cover plies also aid in ultrasonic inspection of the bond line. It will be appreciated that cover pieces 123a and 123b may be formed from adhesive material alone, a light scrim embedded within an adhesive or other suitable material, or may comprise structural lamina.

It will be appreciated that the method of the present invention is particularly well suited for automation using simple robots. The use of robotics reduces production costs, and ensuring precise manufacture and assembly of the joint. A pre-programmed robot could translate slowly along the joint, cutting the edges of the two laminates and inserting bridge piece 116 and outer cover pieces 123a and 123b or recording the relative tooth positions of the two precut pieces to be joined and sending information to a remote cutter to make bridge piece 116 custom fit for the final relative position of the two pieces. This allows large assembly tolerances between the pieces, thereby reducing manufacturing assembly costs. The robot could also apply the necessary temperature and pressure to cure the assembly as it progresses, using magnets or some other mechanical or electrical means. Alternately, the bond teeth could be used as an aligning feature to aid assembly. This joining technique is applicable to any structural panel splice, such as aircraft fuselage production splices or wing spar joints.

With the bonded joints of present invention, potentially large assembly tolerances can be allowed for, because the edges of the two laminates can be brought into position prior to trimming and cut on assembly to accommodate pre-toothed, fixed-width bridge pieces. Therefore, the edges of the bonded laminates need not be trimmed or located precisely prior to assembly.

An important advantage of the present invention is that the joint can be visually inspected for failures. If the joint is overloaded, the tip areas of the teeth and adhesive will react by cracking or discoloring. In those embodiments in which a fiberglass fabric is installed over the joint, the fiberglass fabrics react to over-straining by discoloring. For example, such fabrics produce a yellow spot in an otherwise clear fabric when over-strained.

It is apparent that an invention with significant advantages has been described and illustrated. Although the present invention is shown in a limited number of forms, it is not limited to just these forms, but is amenable to various changes and modifications without departing from the spirit thereof.

The invention claimed is:

1. A method of joining two fiber composite laminates comprising the steps of:
   cutting a first set of teeth in the end of the first fiber composite laminate;
   cutting a second set of teeth in the end of the second fiber composite laminate, the second set of teeth being matingly aligned with the first set of teeth;
   spatially aligning the first fiber composite laminate and the second fiber composite laminate so as to produce a variable thickness bondline therebetween;
   disposing an adhesive in the bondline; and
   curing the adhesive;
   wherein the variable thickness bondline is thickest near the tips of the teeth and thinnest near the midpoint of the teeth.

2. The method according to claim 1, wherein the first set of teeth and the second set of teeth do not mechanically interlock.

3. The method according to claim 2, wherein the first set of teeth and the second set of teeth have generally triangular profiles.

4. The method according to claim 1, wherein the first set of teeth and the second set of teeth mechanically interlock.

5. The method according to claim 4, wherein the first set of teeth and the second set of teeth have elliptical profiles.

6. The method according to claim 4, wherein the first set of teeth and the second set of teeth have rhombus-shaped profiles.

7. The method according to claim 1 further comprising the steps of:
   applying a cover piece over at least one surface of the joint.

8. The method according to claim 7, wherein the cover piece is a fiberglass fabric.

9. The method according to claim 8, wherein the fiberglass fabric changes color when subjected to strain, thereby providing a visual indication of a level of strain in the joint.

10. The method according to claim 1, wherein the adhesive initially fails by cracking, thereby providing a visual indication of an initial failure of the joint.

11. The method according to claim 4, wherein the joint is configured to react to a pre-selected limit load after an initial failure.

12. The method according to claim 1, wherein the first set of teeth and the second set of teeth are cut perpendicularly to the layers of the first and second fiber composite laminates.

13. The method according to claim 1, wherein the first set of teeth and the second set of teeth are cut at an angle that is not perpendicular to the layers of the first and second fiber composite laminates.

14. The method according to claim 1, wherein the joint extends in a generally straight path.

15. The method according to claim 1, wherein the joint extends in a curved path.

16. The method according to claim 1, wherein the joint extends in a staggered offset path.

17. The method according to claim 1, further comprising:
   building up the joint end of the first fiber composite laminate with additional layers of fibers.

18. The method according to claim 1, further comprising:
   building up the joint ends of the first fiber composite laminate and the second fiber composite laminate with additional layers of fibers.

19. The method according to claim 1, further comprising:
   disposing a bridge piece between the first composite laminate and the second composite laminate, the bridge piece having teeth on each end that corresponding mate with the first set of teeth and the second set of teeth.

20. A method of joining a component part to a fiber composite laminate comprising the steps of:
   cutting a first set of teeth in the end of the fiber composite laminate;
   cutting a second set of teeth in the end of the component part, the second set of teeth being matingly aligned with the first set of teeth;
   spatially aligning the first fiber composite laminate and the component part so as to produce a variable thickness bondline therebetween;
   disposing an adhesive in the bondline; and
   curing the adhesives;
   wherein the variable thickness bondline is thickest near the tips of the teeth and thinnest near the midpoint of the teeth.

21. The method according to claim 20 wherein the second set of teeth do not pass entirely through the thickness of the component part.

22. The method according to claim 20 wherein the first set of teeth and the second set of teeth do not mechanically interlock.

23. The method according to claim 20 wherein the first set of teeth and the second set of teeth mechanically interlock.

24. The method according to claim 20 wherein the first set of teeth and the second set of teeth have elliptical profiles.

* * * * *

UNITED STATES PATENT AND TRADEMARK OFFICE
CERTIFICATE OF CORRECTION

PATENT NO. : 7,731,817 B2  Page 1 of 8
APPLICATION NO. : 10/546493
DATED : June 8, 2010
INVENTOR(S) : James Donn Hethcock et al.

It is certified that error appears in the above-identified patent and that said Letters Patent is hereby corrected as shown below:

Delete the title page and substitute therefore the attached title page consisting of corrected number of drawing sheets and illustrative figure.

Delete Drawing Sheets 1-8 and substitute therefore the attached Drawing Sheets 1-6.

Signed and Sealed this

Thirty-first Day of August, 2010

David J. Kappos
*Director of the United States Patent and Trademark Office*

(12) United States Patent
Hethcock et al.

(10) Patent No.: US 7,731,817 B2
(45) Date of Patent: Jun. 8, 2010

(54) INTERLOCKING TOOTH BOND FOR ASSEMBLY OF FIBER COMPOSITE LAMINATES

(75) Inventors: James Donn Hethcock, Colleyville, TX (US); Rodney H. Jones, Colleyville, TX (US)

(73) Assignee: Bell Helicopter Textron Inc., Fort Worth, TX (US)

( * ) Notice: Subject to any disclaimer, the term of this patent is extended or adjusted under 35 U.S.C. 154(b) by 1005 days.

(21) Appl. No.: 10/546,493

(22) PCT Filed: Feb. 24, 2004

(86) PCT No.: PCT/US2004/005584

§ 371 (c)(1),
(2), (4) Date: Jul. 7, 2006

(87) PCT Pub. No.: WO2004/110738

PCT Pub. Date: Dec. 23, 2004

(65) Prior Publication Data

US 2006/0251847 A1 Nov. 9, 2006

(51) Int. Cl.
  *B32B 37/12* (2006.01)
  *B32B 37/18* (2006.01)
  *B32B 38/04* (2006.01)
  *B32B 3/06* (2006.01)
(52) U.S. Cl. .............. 156/258; 156/304.1; 156/304.3; 156/304.5; 156/305; 428/59; 428/62
(58) Field of Classification Search .............. 156/258, 156/304.1, 304.3, 304.5, 305; 428/57, 58, 428/60, 61, 62
See application file for complete search history.

(56) References Cited

U.S. PATENT DOCUMENTS

| | | | | |
|---|---|---|---|---|
| 1,747,964 | A | * | 2/1930 | Wirth ......................... 403/265 |
| 2,027,747 | A | | 1/1936 | Morton |
| 2,792,318 | A | | 5/1957 | Welch |
| 3,224,316 | A | * | 12/1965 | Grikscheit et al. ............ 411/13 |
| 3,793,402 | A | * | 2/1974 | Owens ......................... 525/81 |
| 4,301,684 | A | * | 11/1981 | Thompson et al. ............ 73/602 |
| 5,474,635 | A | * | 12/1995 | Jacob et al. .................. 156/257 |
| 5,506,018 | A | | 4/1996 | Jacob |
| 5,601,676 | A | * | 2/1997 | Zimmerman et al. .......... 156/98 |
| 5,618,602 | A | * | 4/1997 | Nelson ......................... 428/60 |

FOREIGN PATENT DOCUMENTS

DE    2441470 A1    3/1976

(Continued)

OTHER PUBLICATIONS

European Patent Office, Supplementary European Search Report for corresponding European patent application No. EP04775802, Dec. 11, 2008.

(Continued)

*Primary Examiner*—Kat Wyrozebski
*Assistant Examiner*—Scott W Dodds
(74) *Attorney, Agent, or Firm*—James E. Walton

(57) ABSTRACT

An improved method of joining fiber composite laminates is disclosed. Two fiber composite laminates may be joined together end-to-end. The bonding is done through the thickness of the fiber composite laminates. There are two ways to form the bond: (1) non-interlocking; and (2) interlocking.

24 Claims, 6 Drawing Sheets

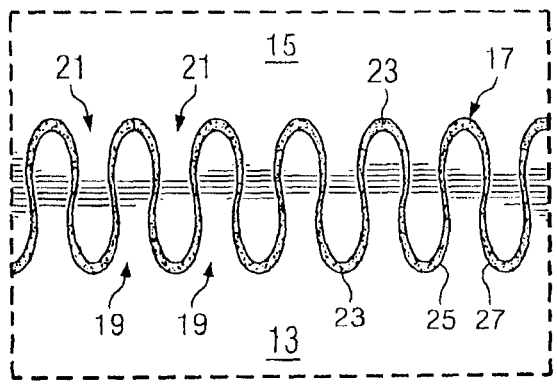

*FIG. 3A*　　*FIG. 3B*　　*FIG. 3C*